(12) United States Patent
Miao et al.

(10) Patent No.: US 8,966,887 B2
(45) Date of Patent: Mar. 3, 2015

(54) RECONFIGURABLE BI-METALLIC MIXER FOR AN EXHAUST AFTERTREATMENT SYSTEM AND METHOD OF USING THE SAME

(75) Inventors: Yong Miao, Ann Arbor, MI (US); Paolo Di Martino, Turin (IT)

(73) Assignee: GM Global Technology Operations LLC, Detroit, MI (US)

(*) Notice: Subject to any disclaimer, the term of this patent is extended or adjusted under 35 U.S.C. 154(b) by 490 days.

(21) Appl. No.: 13/082,962

(22) Filed: Apr. 8, 2011

(65) Prior Publication Data

US 2012/0255278 A1    Oct. 11, 2012

(51) Int. Cl.
*F01N 3/24*       (2006.01)
*B01F 5/06*       (2006.01)
*F01N 3/28*       (2006.01)
*F01N 13/16*      (2010.01)
*B01F 5/04*       (2006.01)
(Continued)

(52) U.S. Cl.
CPC ............ *B01F 5/0616* (2013.01); *F01N 3/2892* (2013.01); *F01N 13/16* (2013.01); *B01F 5/0473* (2013.01); *B01F 15/066* (2013.01); *B01F 3/04049* (2013.01); *F01N 13/009* (2013.01); *F01N 3/103* (2013.01); *F01N 3/2066* (2013.01); *F01N 3/021* (2013.01); *F01N 2240/20* (2013.01); *F01N 2290/00* (2013.01); *F01N 2610/14* (2013.01); *F01N 2240/16* (2013.01); *F01N 2610/02* (2013.01); *F01N 2610/03* (2013.01); *F01N 2610/102* (2013.01); *B01F 2015/062* (2013.01); *B01F 2005/0639* (2013.01)
USPC ............................................. 60/317; 60/324

(58) Field of Classification Search
CPC .............. F01N 2240/20; F01N 3/2892; F01N 2470/30; F01N 2240/36; F01N 2290/00
USPC ............................ 60/295, 301, 317, 319, 324
See application file for complete search history.

(56) References Cited

U.S. PATENT DOCUMENTS

| | | | |
|---|---|---|---|
| 2010/0071352 A1* | 3/2010 | Tatur et al. | 60/287 |
| 2011/0146254 A1* | 6/2011 | Yi et al. | 60/310 |
| 2011/0258983 A1* | 10/2011 | Vosz | 60/274 |

FOREIGN PATENT DOCUMENTS

| | | | | |
|---|---|---|---|---|
| DE | 3940747 C1 | 7/1990 | | |
| JP | 10299465 A * | 11/1998 | | F01N 3/24 |

OTHER PUBLICATIONS

Machine translation of JP H10-299465 A, acessed May 21, 2014.*

(Continued)

*Primary Examiner* — Thomas Denion
*Assistant Examiner* — Jonathan Matthias
(74) *Attorney, Agent, or Firm* — Cantor Colburn LLP

(57) ABSTRACT

A mixer for an exhaust aftertreatment system is disclosed. The mixer includes a body portion that is configured to be disposed in an exhaust conduit of an exhaust aftertreatment system upstream of an exhaust aftertreatment device. The mixer also includes an airfoil portion that is disposed on the body portion and reversibly movable between a deployed position and a retracted position, wherein in the deployed position the airfoil portion provides a deployed resistance to an exhaust gas flow and in the retracted position provides a retracted resistance thereto, and the deployed resistance is greater than the retracted resistance, the body portion and airfoil portion comprising a mixer. The mixer further includes a bimetallic couple that is operatively joined to the mixer and configured to reversibly move the airfoil portion from the retracted position to the deployed position.

20 Claims, 7 Drawing Sheets

| (51) | Int. Cl. | |
|---|---|---|
| | *B01F 15/06* | (2006.01) |
| | *B01F 3/04* | (2006.01) |
| | *F01N 13/00* | (2010.01) |
| | *F01N 3/10* | (2006.01) |
| | *F01N 3/20* | (2006.01) |
| | *F01N 3/021* | (2006.01) |

(56) References Cited

OTHER PUBLICATIONS

Chinese Office Action for Application No. 201210234658.X dated, Jan. 24, 2014; 9 pages.

\* cited by examiner

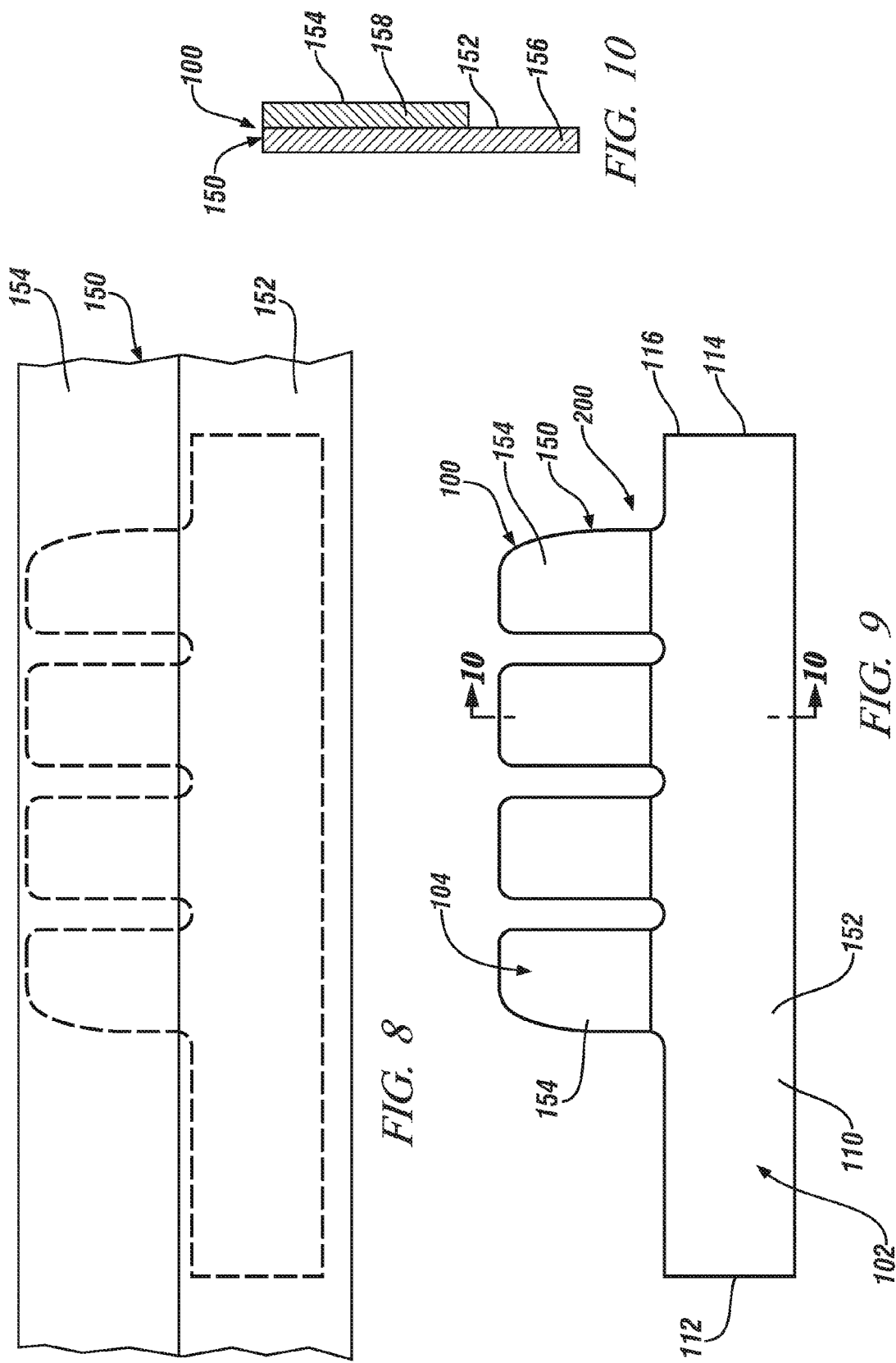

RECONFIGURABLE BI-METALLIC MIXER FOR AN EXHAUST AFTERTREATMENT SYSTEM AND METHOD OF USING THE SAME

FIELD OF THE INVENTION

Exemplary embodiments of the invention are related to reconfigurable mixers for exhaust aftertreatment systems and, more specifically, to exhaust systems employing these mixers to enhance system performance, and even more specifically, to methods of using the same.

BACKGROUND

Internal combustion engine exhaust aftertreatment systems employ oxidation catalysts (OC), selective catalytic reduction (SCR) catalysts, particulate filters (PF) and other exhaust aftertreatment devices. In these systems, the OC devices frequently employ upstream located hydrocarbon (HC) injectors to inject HC, generally fuel, into the exhaust gas flow for oxidation in the OC to raise the temperature of the exhaust gas flow; such as when regeneration of the PF is desired. The efficient use of the HC in the OC is of critical importance, since it directly affects the efficiency (e.g., fuel economy) of the engine, as well as the emission performance of the engine and exhaust aftertreatment system, since the emission of unburned HC (HC slip) is regulated by law. In order to ensure efficient HC utilization in systems that employ HC injection, these systems frequently employ mixers downstream of the injectors, also referred to as evaporators or vaporizers, to ensure that the liquid fuel injected into the system is completely vaporized and dispersed into the exhaust gas flow so that it can be oxidized to the greatest extent possible in the OC. These mixers are designed to promote turbulence in the exhaust gas flow to provide mixing and dispersion of the HC. While effective for this purpose, mixers also create backpressure in the exhaust gas flow that is associated with the partial obstruction of the flow passage and the creation of the intended turbulence. Since the mixers are permanently installed in these systems, they create backpressure and affect flow even when HC is not being injected and their use is not needed.

Other mixers are also employed in conjunction with the use of other exhaust aftertreatment devices. For example, the SCR catalyst devices employed frequently include urea SCR (U-SCR) catalysts that require upstream injection of urea, such as a urea-water solution, into the exhaust gas flow. The performance, durability and operating cost of the U-SCR catalyst devices and other downstream aftertreatment devices depend strongly on the mixing and dispersion (e.g., evaporation) of the injected fluid into the exhaust gas flow. Mixers are also used upstream of these devices to increase the dispersion of the injected fluid into the exhaust gas flow and the production of ammonia for catalysis. These mixers may also produce undesirable system backpressure and affect flow even when urea is not being injected and their use is not needed.

Accordingly, it is desirable to provide mixers and exhaust aftertreatment systems having mixers, and employing mixing methods, that provide the desired mixing functions and also reduce system backpressure.

SUMMARY OF THE INVENTION

In one exemplary embodiment of the invention a mixer for an exhaust aftertreatment system is provided. The mixer includes a body portion that is configured to be disposed in an exhaust conduit of an exhaust aftertreatment system upstream of an exhaust aftertreatment device. The mixer also includes an airfoil portion that is disposed on the body portion and reversibly movable between a deployed position and a retracted position, wherein in the deployed position the airfoil portion provides a deployed resistance to an exhaust gas flow and in the retracted position provides a retracted resistance thereto, and the deployed resistance is greater than the retracted resistance, the body portion and airfoil portion comprising a mixer. The mixer further includes a bimetallic couple that is operatively joined to the mixer and configured to reversibly move the airfoil portion from the retracted position to the deployed position.

In another exemplary embodiment of the invention an exhaust aftertreatment system for an internal combustion engine is provided. The system includes an exhaust aftertreatment device that is configured for fluid communication with an internal combustion engine to receive an exhaust gas flow therefrom through an exhaust conduit. The system also includes a mixer that is located in the exhaust conduit upstream of the exhaust aftertreatment device, the mixer comprising a body portion that is configured to be disposed in the exhaust conduit and an airfoil portion that is disposed on the body portion and reversibly movable between a deployed position and a retracted position, wherein in the deployed position the airfoil portion provides a deployed resistance to the exhaust gas flow and in the retracted position provides a retracted resistance, and the deployed resistance is greater than the retracted resistance. The system further includes an injector that is located upstream of the mixer, the injector configured to inject a reactant into the exhaust gas flow.

In yet another exemplary embodiment of the invention, a method of operating an exhaust aftertreatment system for an internal combustion engine is provided. The method includes disposing a mixer into an exhaust conduit of an exhaust aftertreatment system, the mixer comprising a body portion that is configured to be disposed in the exhaust conduit and an airfoil portion comprising an active material that is disposed on the body portion and reversibly movable between a deployed position and a refracted position by activation of the active material, wherein in the deployed position the airfoil portion provides a deployed resistance to an exhaust gas flow and in the retracted position provides a retracted resistance, and the deployed resistance is greater than the retracted resistance. The method also includes operating an internal combustion engine to produce the exhaust gas flow in the exhaust conduit. The method further includes activating the active material to move the airfoil portion to the deployed position. Still further, the method includes initiating injection of a reactant material into the exhaust conduit through an injector located upstream of the mixer and terminating injection of the reactant material. Yet further, the method includes deactivating the active material to move the airfoil portion to the retracted position.

The above features and advantages and other features and advantages of the invention are readily apparent from the following detailed description of the invention when taken in connection with the accompanying drawings.

BRIEF DESCRIPTION OF THE DRAWINGS

FIG. 8 is a front plan view of an exemplary embodiment of a composite metal sheet that may be used to form a section of a mixer as disclosed herein;

FIG. 9 is a front plan view of an exemplary embodiment of a mixer section formed from the composite metal sheet of FIG. 8;

FIG. 10 is a cross-sectional view of the mixer of FIG. 9 taken along section 10-10 and illustrating an exemplary embodiment of a bi-metallic couple as disclosed herein;

Figure 1:
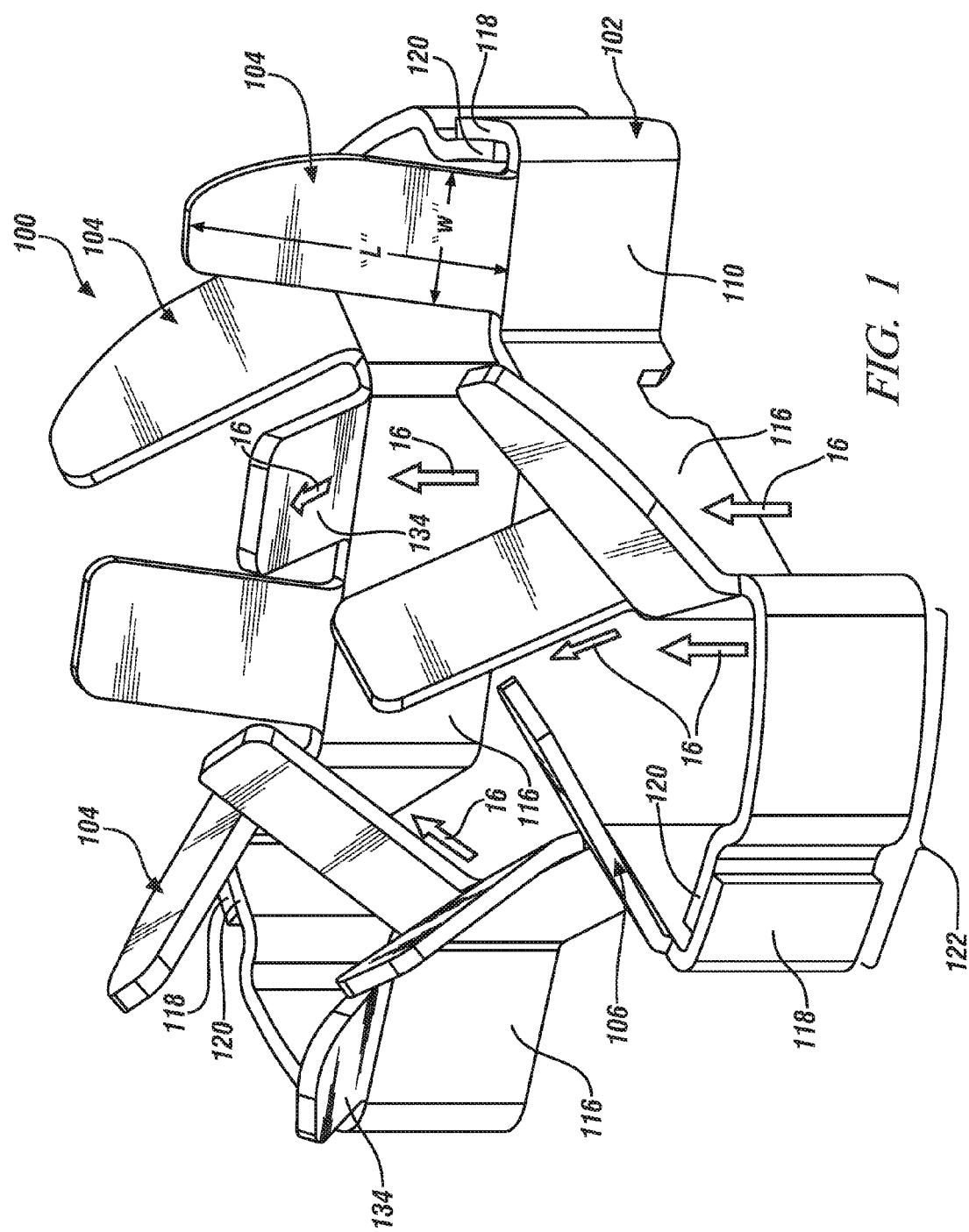
FIG. 1 is a perspective view of an exemplary embodiment of a mixer as disclosed herein in a deployed position.
Figure 2:
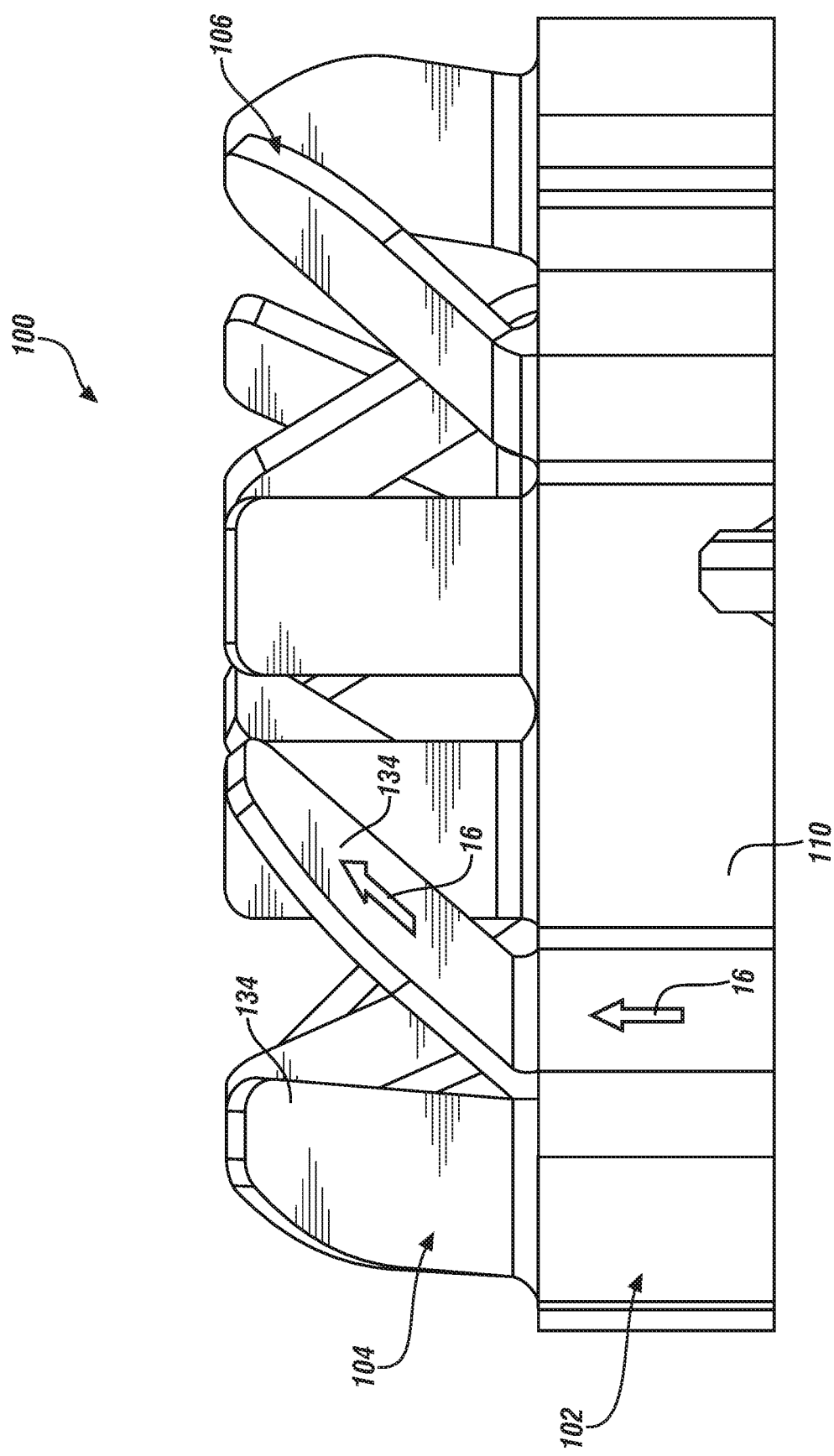
FIG. 2 is a side plan view of the mixer of FIG. 1.
Figure 3A:
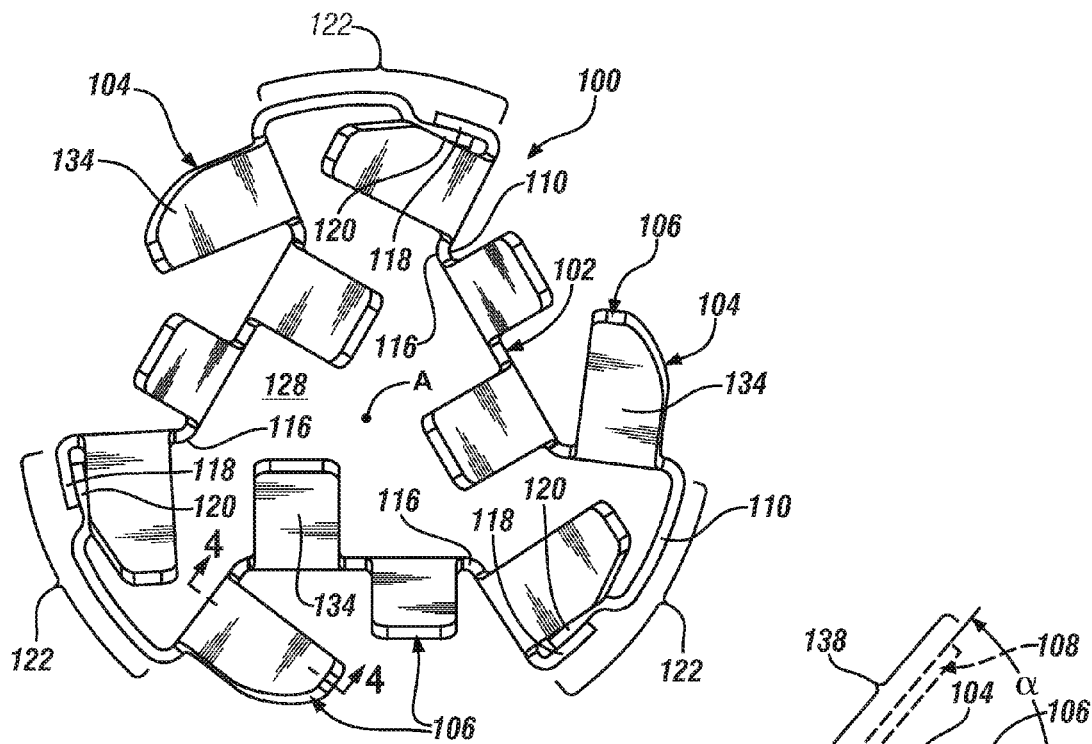
FIG. 3A is a top view of the mixer of FIG. 1.

Other objects, features, advantages and details appear, by way of example only, in the following detailed description of embodiments, the detailed description referring to the drawings in which:

DESCRIPTION OF THE EMBODIMENTS

Referring to FIGS. 1-6, in accordance with an exemplary embodiment of the present invention a mixer 100 for an exhaust aftertreatment system 10 of an internal combustion engine 12 is disclosed. The mixer 100 is configured for disposition within an exhaust gas conduit 14 of exhaust aftertreatment system 10. It may be disposed within exhaust gas conduit 14 in any suitable manner. This may include all manner of fixed attachments, such as various types of welds, or detachable attachments, including various threaded fasteners, clips, clamps, spring bias, interference fits or other detachable attachments, or a combination thereof. Mixer 100 is reconfigurable during operation of engine 12 and exhaust aftertreatment system 10 to change the nature of exhaust gas flow 16 within exhaust gas conduit 14 proximate the mixer 100 and change the amount or degree of turbulence in the flow. Mixer 100 may be configured to promote more turbulent flow in conjunction with the upstream injection of a reactant fluid, such as HC or urea, into exhaust gas conduit 14 and exhaust gas flow 16 in order to promote or enhance mixing of the reactant fluid into the flow. Mixer 100 may then be reconfigured to promote less turbulent flow under other operating conditions, such as when a reactant fluid is not being injected into exhaust gas conduit 14 and exhaust gas flow 16. Mixer 100 may be disposed upstream of any suitable exhaust aftertreatment device 15, including an oxidation catalyst (OC) device 18, 32, selective catalytic reduction (SCR) catalyst device 22 or particulate filter (PF) device 28. Mixer 100 may preferably be disposed downstream of a reactant fluid injector, such as reductant injector 26 or HC injector 38, to promote mixing of the reactant fluid with exhaust gas flow 16 within exhaust gas conduit 14 and enhance the chemical reaction of the fluid in a downstream exhaust aftertreatment device 15. While this is one useful configuration of mixer 100, it may be disposed in any suitable location with an exhaust aftertreatment system 10 to promote mixing or turbulence of the exhaust gas flow 16.

Figure 3B:
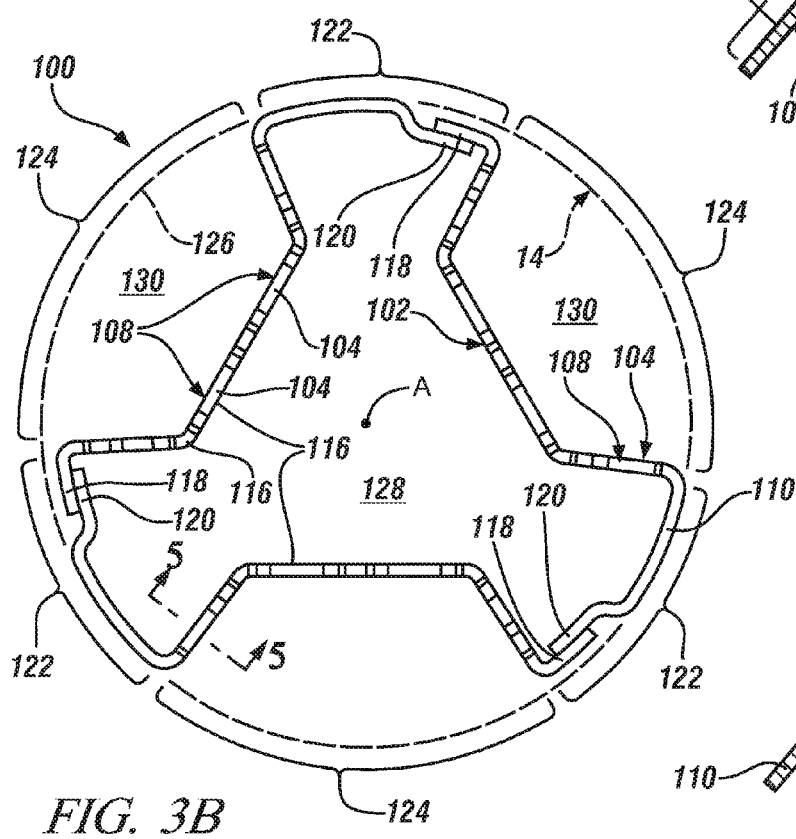
FIG. 3B is a top view of the mixer of FIG. 1 in a retracted position.

Mixer 100 includes a mixer body portion 102 that is configured to be disposed in exhaust gas conduit 14 upstream of an exhaust aftertreatment device 15 in exhaust aftertreatment system 10. Mixer 100 also includes airfoil portions 104 that are disposed on the body portion 102 and are reversibly movable between a deployed position 106 (FIGS. 3A, 4) and a retracted position 108 (FIGS. 3B, 5).

The body portion 102 may have any suitable shape or size, and may include that of an elongated band 110. Band 110 may include a continuous band, such as by forming the band to a closed form, such as a cylindrical form, that enables joining a first end 112 of band 110 to a second end 114 (FIG. 9). Band 110 may also include a discontinuous band 110 having a shape and size where first end 112 is not joined to second end 114, such as a cylindrical band having a radius of curvature greater than that of a cylindrical exhaust gas conduit 14, where the band 110 may be compressed to reduce the radius of curvature below that of the conduit for insertion therein and springs open for disposition by interference or otherwise upon insertion.

Band 110 may also include a plurality of band sections 116 having respective ends 118,120 that may be joined to one another as illustrated in FIGS. 1-5 by any suitable joining method, including welding. Band sections 116 may have any suitable form and may include a plurality of identical shapes or different shapes. As illustrated in FIGS. 1-3B, the band sections may be formed so as to provide any desired band 110 shape when joined to one another. In the exemplary embodiment of FIGS. 1-3B, band sections 116 comprise a tri-lobed form having three radially-extending, circumferentially-spaced lobes 122 that are configured for disposition in exhaust gas conduit 14 by fixed or detachable attachment of mixer 100 to exhaust gas conduit 14. In the embodiment of FIGS. 1-6, the lobes 122 are identical and are equally circumferentially-spaced about a mixer axis A (FIG. 3A). Band 110 also includes inwardly projecting sections 124 that space band 110 from the wall 126 of exhaust gas conduit 14 so that exhaust gas flow 16 may flow within the conduit through both the interior region 128 and exterior regions 130 (FIG. 3B).

The airfoil portion 104 is so named because it is configured in the deployed position 106 (FIGS. 1, 3A and 4) to alter the direction of the exhaust gas flow 16 to promote turbulence in the flow and enhanced mixing of the injected reactant materials, including injected reactant fluids. Airfoil portions 104 provide a reactive force using the relative motion of the exhaust gas flow 16 to redirect the flow, create regions of lift and drag and cause collision of the redirected portions of the exhaust gas flow 16 with one another, portions of the mixer or the wall 126 of exhaust gas conduit 14 thereby promoting turbulent fluid flow conditions and mixing of the injected reactant fluid. Impingement of exhaust gas flow 16 with the heated surfaces of airfoil portions 104 also promote phase changes, such as evaporation or sublimation, in the reactant fluid and further promote mixing of the reactant fluid within exhaust gas flow 16. As used herein, exhaust gas flow 16 also encompasses streams, droplets, particles or other forms of the reactant material (or materials) injected into exhaust gas conduit 14 and into exhaust gas flow 16, regardless of whether the reactant materials may include non-gas constituents, such as solid particles, liquid droplets or otherwise.

In the deployed position 106 the airfoil portions 104 provide a deployed resistance to exhaust gas flow 16 and an associated backpressure in exhaust gas conduit 14. In the retracted position 108, airfoil portions 104 provide a retracted resistance to exhaust gas flow 16 and an associated backpressure in exhaust gas conduit 14, wherein the deployed resistance and backpressure is greater than the retracted resistance and backpressure.

In the exemplary embodiment of FIGS. 1-6, airfoil portions 104 comprise a plurality of reversibly moveable fingers that protrude from band 110 and band sections 116. In the retracted position 108, airfoil portions 104 are generally coplanar with and extend axially from the band 110 and the deployment angle ($\alpha$) is as small as possible, preferably about 0°. In the deployed position 106, airfoil portions 104 are angulated with respect to band 110 at an acute deployment angle ($\alpha$). Any suitable acute angle may be used. In an exemplary embodiment, acute deployment angle ($\alpha$) is preferably between about 30° and about 60°, and more preferably about 45°. In the exemplary embodiment of FIGS. 1-6, airfoil portions 104 have a flat planar airfoil surface 134. In other exemplary embodiments, airfoil surface 134 may have a curved planar shape, and may curve either along its length (l) or across its width (w), or both (FIG. 1). The curvature of the airfoil surface 134 may be relatively simple, such as by having a radius of curvature along either or both dimensions, or may be relatively complex, such as by having a partially spheroidal, helicoidal, parabaloidal, ellipsoidal or other complex curvature along its length or width, or a combination thereof. The airfoil portion 104 and airfoil surface 134 may have a deployed shape 136, FIG. 4, in the deployed position 106 and a retracted shape 138, FIG. 5, in the retracted position 108. The deployed shape 136 and the retracted shape 138 may be the same shape i.e., a flat planar shape), or in the alternative, the deployed shape 136 may be one shape (i.e., a curved planar shape), and the retracted shape 138 may be a different shape (i.e., a flat planar shape).

Figure 4:
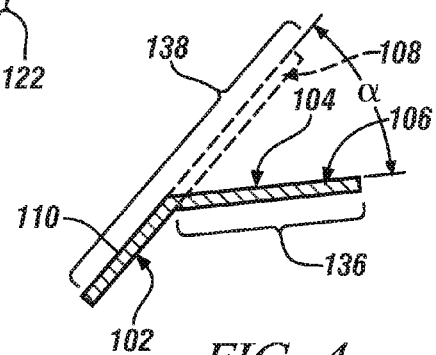
FIG. 4 is a cross-sectional view of the mixer of FIG. 3A taken along section 4-4.
Figure 5:
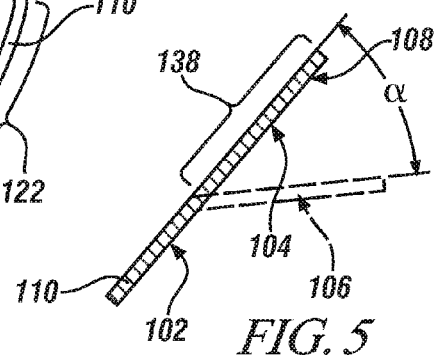
FIG. 5 is a cross-sectional view of the mixer of FIG. 3B taken along section 5-5.

Referring to FIGS. 8-10, mixer 100 comprises a bimetallic couple 150 that is operatively joined to the mixer 100 and configured to reversibly move the airfoil portion 104 from the retracted shape 138, FIG. 5, to the deployed shape 136, FIG. 4. Bimetallic couple 150 comprises at least two different materials, such as a first material 152 and a second material 154, FIG. 10, having different coefficients of thermal expansion (CTE) (i.e. a CTE mismatch), in at least one direction, such as axially along the length (l) of airfoil portions 104. However, to the extent the materials are isotropic, the CTE mismatch may also exist in other directions, such as across the width (w) of airfoil portions 104. The CTE mismatch between the first material 152 and the second material 154 cause the bimetallic couple to deflect or bend in response to a change in temperature; either an increase or decrease. As such, in one exemplary embodiment, the bimetallic couple 150 and first material 152 and second material 154 may be selected and constructed to provide the refracted shape 138 of airfoil portions 104 at ambient temperature and the deployed shape 136 at an operating temperature of the exhaust aftertreatment system 10. In another exemplary embodiment, the bimetallic couple 150 and first material 152 and second material 154 may be selected and constructed to provide the retracted shape 138 of airfoil portions 104 at a first operating temperature of the exhaust aftertreatment system 10 and the deployed shape 136 at second operating temperature of the exhaust aftertreatment system 10 that is higher than the first operating temperature.

The first material 152 and second material 154 used to form the bimetallic couple 150 may be any suitable materials that provide the desired amount of CTE mismatch necessary to achieve the desired response of bimetallic couple 150 and movement of the airfoil portions 104 from the retracted shape 138 to the deployed shape 136 over the predetermined range of operating temperatures at which mixer 100 will be used. The first material 152 and second material 154 may also be selected to provide good high-temperature corrosion and oxidation resistance in the hot exhaust gas flow 16 of the exhaust aftertreatment system 10. In an exemplary embodiment, high-temperature metals and metal alloys may be used, such as various Fe-base, Ni-base or Co-base superalloys; various steels, including stainless steels, and certain copper-base alloys. The first material 152 and the second material 154 are joined together to provide a mechanical couple, such that the differential expansion due to the CTE mismatch causes them to react against one another and provide the desired bending and change of shape described herein. The first material 152 and second material 154 may be joined by any suitable joint and joining method, including cladding, welding, riveting, staking and the like.

In an exemplary embodiment as shown in FIG. 10, the mixer 100 includes a first material 152 in the form of a first metal 156, and the second material 154 in the form of second metal 158 is disposed on the mixer 100 to form the bimetallic couple 150 of the first metal 156 and the second metal 158. The second metal 158 may be disposed on the body portion 102 or the airfoil portion 104, or both of them, to form the bimetallic couple 150. Disposition on the airfoil portion 104 is illustrated in FIG. 10.

Figure 11:
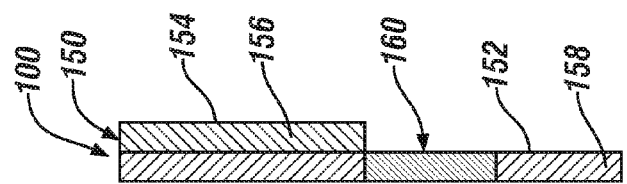
FIG. 11 is a cross-sectional view of the mixer of FIG. 13 taken along section 11-11 and illustrating a second exemplary embodiment of a bi-metallic couple as disclosed herein.

In another exemplary embodiment as shown in FIG. 11, the mixer 100 comprises a first metal 156 and the bimetallic couple 150 comprises a second metal 158 joined to a third metal 160 that are different than the first metal 156, wherein the bimetallic couple 150 may also be disposed on the body portion 102 or the airfoil portion 104, or both of them to form the bimetallic couple 150. Disposition on the airfoil portion 104 is illustrated in FIG. 11.

Figure 13:
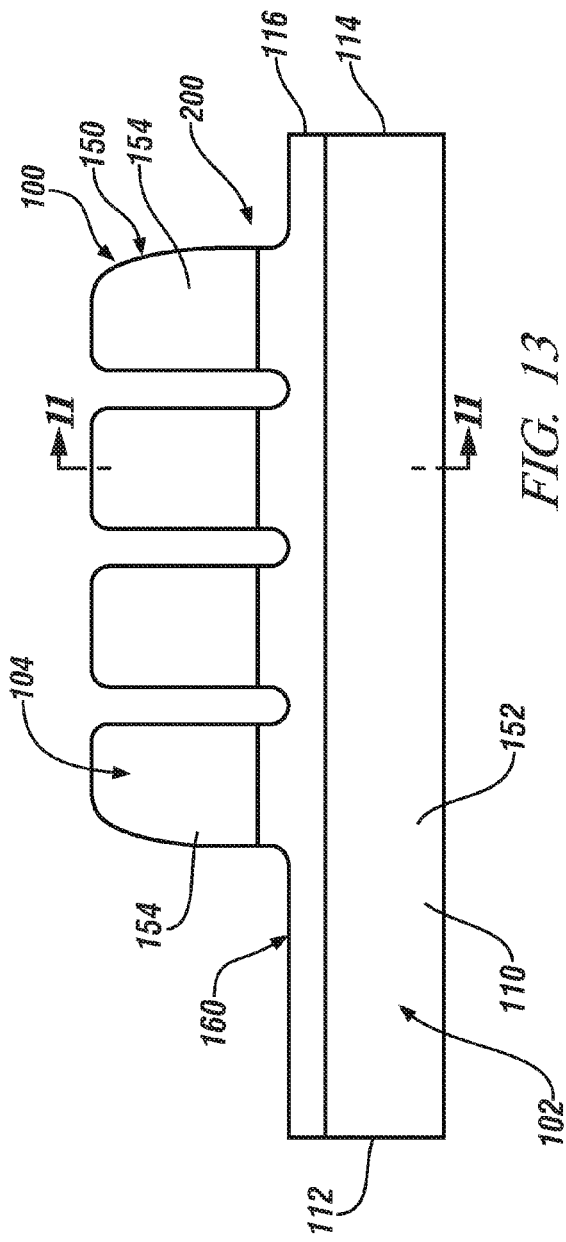
FIG. 13 is a front plan view of an exemplary embodiment of a mixer section formed from the composite metal sheet of FIG. 12.

A precursor mixer 200 or a portion of precursor mixer 100, such as may be used to form a band section 116 having attached airfoil portions 104, may be excised from the composite sheet of bimetallic couple 150 by die cutting to form the shape illustrated in FIGS. 9 and 13. The precursor mixer 200, or portion of mixer 100 such as a band section 116, may then be formed into a plurality of band sections 116 as shown in FIGS. 1-6, such as by various die stamping or other metal forming methods suitable for forming mixer 100. The bimetallic couple 150 may be provided as described herein either before or after the forming the band sections 116.

Figure 12:
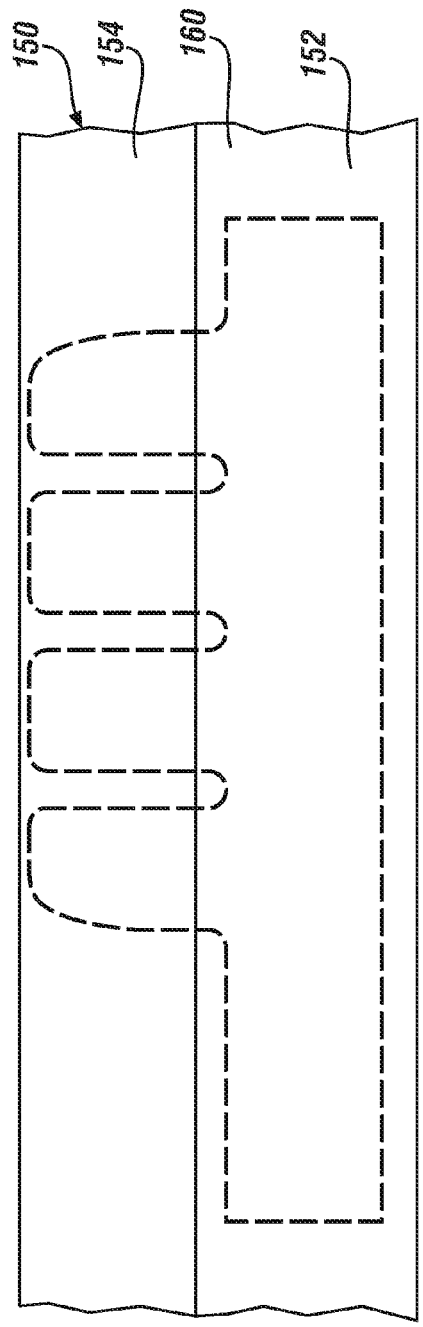
FIG. 12 is a front plan view of a second exemplary embodiment of a composite metal sheet that may be used to form a section of a mixer as disclosed herein.

In another exemplary embodiment, third metal 160, FIGS. 11-13, may comprise an active material which is configured for activation and reversible movement of the airfoil portion 104 between the deployed position 106 and the retracted position 108. Airfoil portion 104 may be formed entirely of active material or partially of active material with the amount of active material used depending on, for example, cost and performance requirements. Since active material may be more expensive than stainless steels and other high temperature materials suitable for forming the band 110 or other non-movable portions of airfoil portion 104, it may be preferable in certain embodiments to minimize the amount of active material used by limiting its use to those portions of airfoil portion 104 that require movement in order to form airfoil surface 134 or move airfoil surface 134 from the deployed position 106 to the refracted position 108. The bimetallic couple 150 may then be configured and used, for example, to affect the curvature of the airfoil portion 104 along its length "L" and width "W" in the deployed position 106 to achieve the deployed shape 136, and the retracted position 108 to achieve the retracted shape 138.

The active material may include a two-way shape memory alloy (SMA). Shape memory alloys exhibit properties that are unique in that they are typically not found in other metals. The shape memory effect (SME) is manifested when the metal is first severely deformed by bending, pressure, shear, or tensile strains in its cold state. The accumulated strain can then be removed by increasing the temperature above its transformation temperature that allows it to recover its original shape formed in its hot state. In this way, the material appears to "remember" its original shape. A shape memory alloy, exhibiting a one-way shape memory effect, does not return to its deformed shape when returning to its cold state. Any desired deformation should be stress-induced in the cold state. The underlying microstructural effect is based upon stress-induced detwinning (deformation) in the cold state and temperature-induced martensitic-to-austenitic phase transformation (shape recovery). Alternatively, superelasticity, which is the other main property of SMAs, allows these materials to be deformed via a stress-induced austenitic-to-martensitic (SIM) phase transformation in the hot state. In tension, a linear stress-strain curve is noted as the austenitic material deforms until the martensitic transformation. The strain then increases at constant stress (i.e. the stress-strain curve reaches a plateau) until all of the material is martensite. The material recovers its shape when the stress is released leading to an inverse phase transformation. Note that cold and hot states are relative to the transformation temperatures and can be tailored to specific applications, including exposure to the operating temperatures of exhaust aftertreatment system 10. Another advantage of some SMAs, such as Ni—Ti alloys, over other metals typically used for mixers is their resistance to corrosion.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the SMA is in the martensite phase and is heated, it begins to change into the austenite phase. The temperature at which this phenomenon starts is often referred to as the austenite start temperature ($A_s$). The temperature at which this phenomenon is complete is called the austenite finish temperature ($A_f$). When the SMA is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the SMA is preferably carried out at or below the austenite transition temperature. Subsequent heating above the austenite transition temperature causes the deformed shape memory material sample to revert back to its permanent shape. Thus, a suitable activation signal for use with SMAs is a thermal activation signal having a magnitude that is sufficient to cause transformations between the martensite and austenite phases.

The austenite finish temperature, i.e., the temperature at which the SMA remembers its high temperature form when heated, can be adjusted by slight changes in the composition of the alloy and through thermo-mechanical processing. In nickel-titanium SMAs, for example, it can be changed from above about 270° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the SMA vary greatly over the temperature range spanning their transformation, providing shape memory effect, superelastic effect, and high damping capacity. For example, in the martensite phase a lower elastic modulus than in the austenite phase is observed. Shape memory alloys in the martensite phase can undergo large deformations by realigning the crystal structure rearrangement with the applied stress. The material will retain this shape after the stress is removed.

As noted above, shape recovery occurs when the SMA undergoes deformation while in the malleable low-temperature phase and then encounters heat greater than the transformation temperature (i.e., austenite finish temperature). Recovery stresses can exceed 400 MPa (60,000 psi). Recoverable strain is as much as about 8% (about 4% to about 5% for the copper SMAs) for a single recovery cycle and generally drops as the number of cycles increase.

The SMA may be in any suitable form, such as a band, sheet or strip as described herein, but the use of other forms is not precluded. The specific form as well as composition is not intended to be limited. Suitable SMA materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect (e.g., change in shape, orientation, yield strength, flexural modulus, damping capacity, superelasticity, and/or similar properties). Selection of a suitable SMA composition depends on the temperature range where the mixer 100 will operate in exhaust aftertreatment system 10. In an exemplary embodiment, the SMA comprises a nickel titanium alloy.

The two-way shape memory training procedure can be performed by conventional SME training or SIM training. In SME training, the specimen is cooled below $M_f$ and bent to the desired shape. It is then heated to a temperature above $A_f$ and allowed to freely take its austenite shape. The procedure is repeated 20-30 times, which completes the training. The specimen now assumes its programmed shape upon cooling under $M_f$ and assumes its austenite shape when heated above $A_f$. In SIM training, the specimen is bent just above $M_s$ to produce the preferred variants of stress-induced martensite and then cooled below the $M_f$ temperature. Upon subsequent heating above the $A_f$ temperature, the specimen takes its original austenitic shape. This procedure is repeated 20-30 times.

In an exemplary embodiment, the retracted position 108 and retracted shape 138 may be the programmed shape and position assumed by airfoil portion 104 and airfoil surface 134 when the SMA is below $M_f$, and the deployed position 106 and deployed shape 136 may be the programmed shape assumed by airfoil portion 104 and airfoil surface 134 when the SMA is heated above $A_f$.

Figure 6:
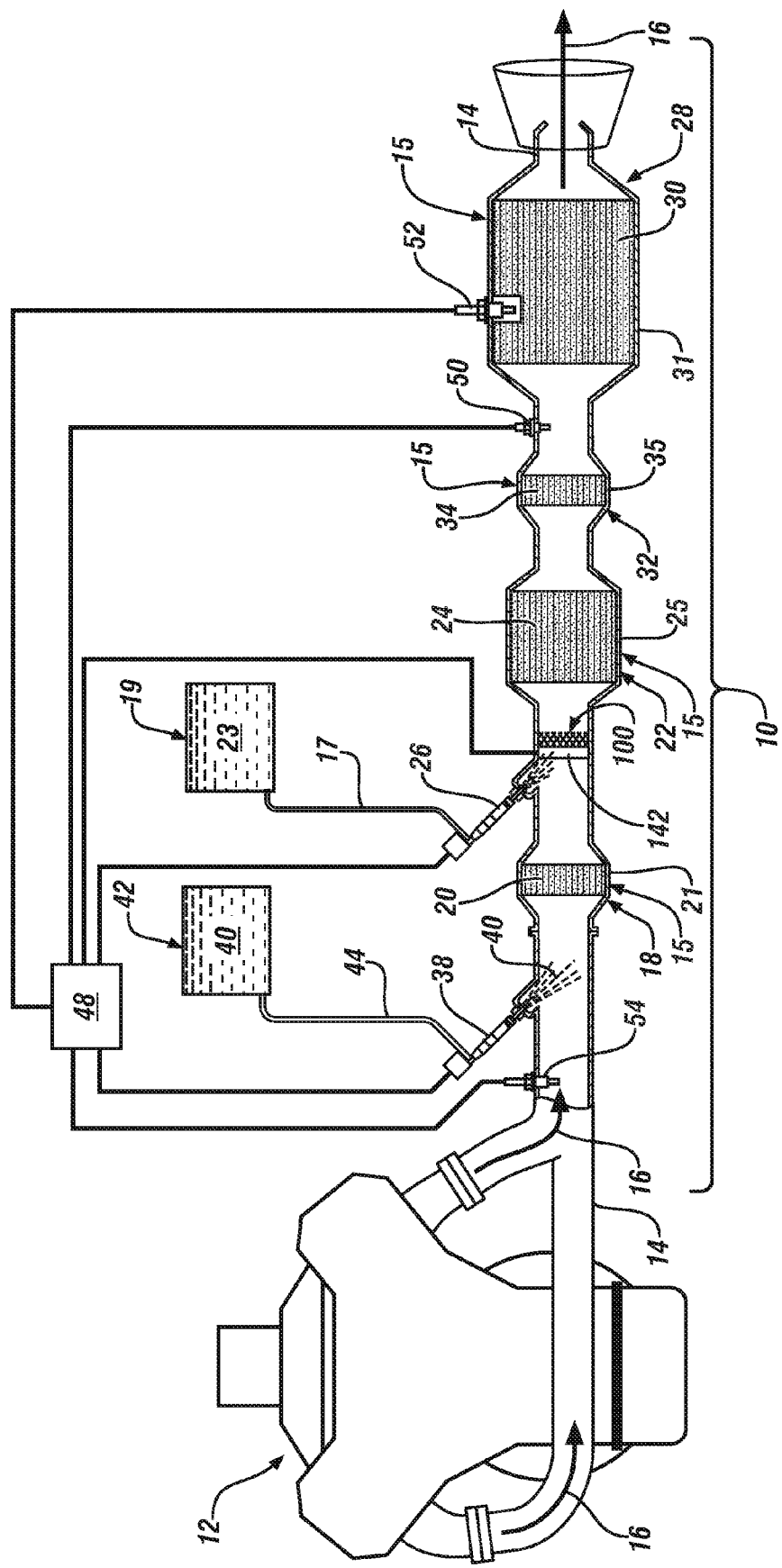
FIG. 6 is a schematic illustration of an exemplary embodiment of an exhaust aftertreatment system having a mixer as disclosed herein.
Figure 7:
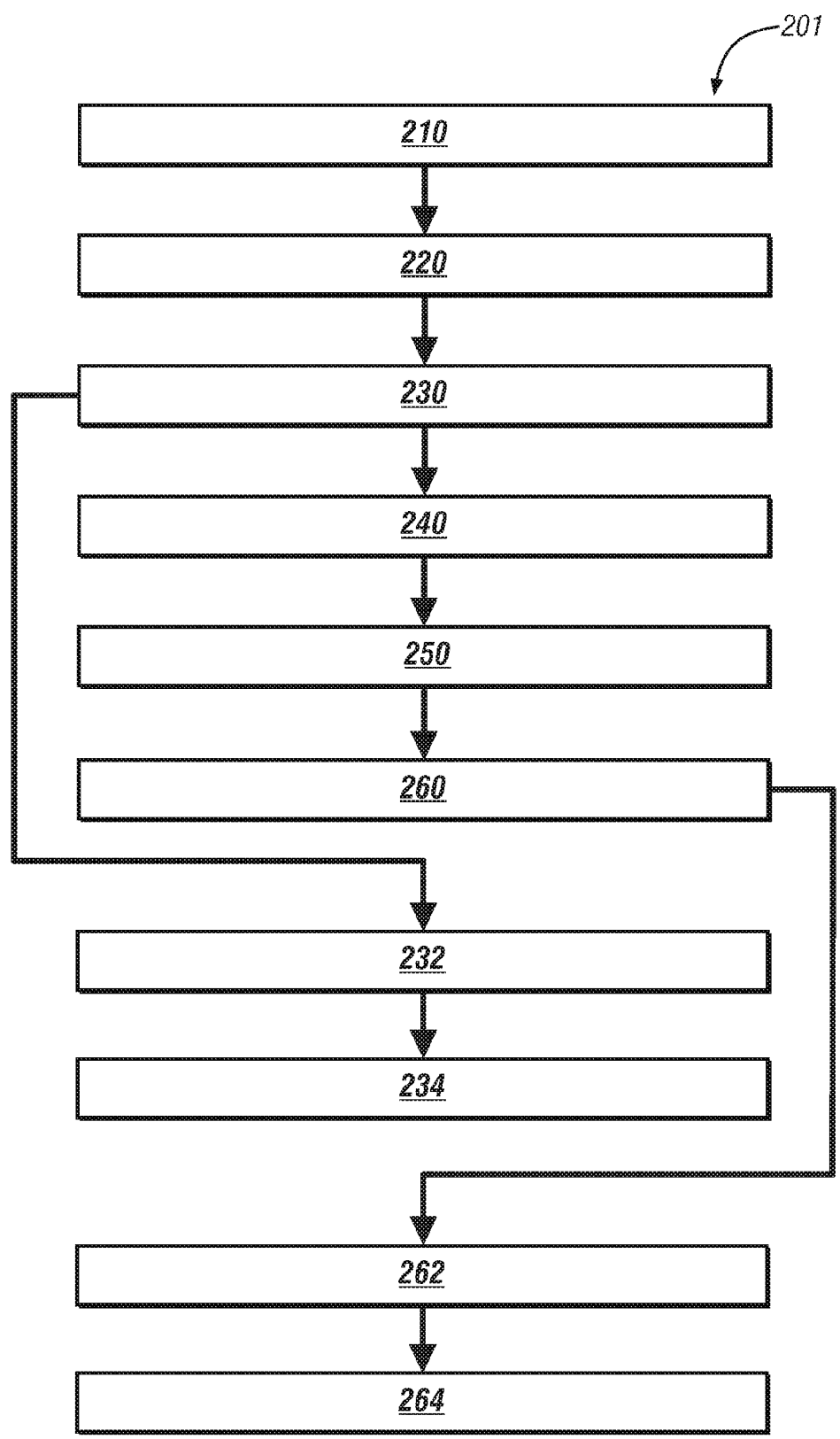
FIG. 7 is flow chart of an exemplary embodiment of a method of using an exhaust aftertreatment system and mixer as disclosed herein.

Referring now to FIG. 6, an exemplary embodiment of the invention is directed to the exhaust gas aftertreatment system, referred to generally as 10, for the reduction of regulated exhaust gas constituents emitted by the internal combustion engine 12. Engine 12 may include any internal combustion engine, including those fueled by gasoline, diesel, biodiesel, natural gas or other hydrocarbon fuels. Such engines may include, but are not limited to, gasoline direct injection systems and homogeneous charge compression ignition engine systems.

The exhaust gas conduit 14 that may comprise several segments that function to transport exhaust gas flow 16 from the engine 12 to the various exhaust aftertreatment devices 15 of the exhaust aftertreatment system 10. References herein to disposition of mixer 100 in exhaust gas conduit 14 includes disposition in exhaust gas conduit 14 as well as disposition within any of exhaust aftertreatment devices 15 that are in fluid communication with exhaust gas flow 16. The exhaust aftertreatment devices 15 may include a first oxidation catalyst device (OC1) 18. OC1 may be constructed with a flow-through metal or ceramic monolith substrate 20 that is packaged in a rigid shell or canister 21 having an inlet and an outlet in fluid communication with the exhaust gas conduit 14. The substrate 20 has an oxidation catalyst compound (not shown) disposed thereon. The oxidation catalyst compound may be applied as a wash coat and my contain platinum group metals such as platinum (Pt), palladium (Pd), rhodium (Rh) or other suitable oxidizing catalysts, or a combination thereof. The OC1 18 is useful in treating unburned gaseous and non-volatile HC and CO, which are oxidized in an exothermic reaction, to form carbon dioxide and water. In the exemplary embodiment of FIG. 6, OC1 18 is located upstream of the mixer 100 and may be configured to provide an increase in the temperature of the exhaust gas flow 16 and thermal activation of the bi-metallic couple 150, as well as active material if employed, thereby causing airfoil portions 104 to move from the refracted position 108 to the deployed position 106.

The SCR catalyst device 22 disposed downstream of the OC1 18 may also be constructed with a flow-through ceramic or metal monolith substrate 24 which is packaged in a rigid shell or canister 25 having an inlet and an outlet in fluid communication with the exhaust gas conduit 14. The substrate 24 has a $NO_X$ reducing catalyst composition such as an SCR catalyst composition (not shown) applied thereto. The SCR catalyst composition preferably contains a zeolite and one or more base metal components such as iron (Fe), cobalt (Co), copper (Cu) or vanadium (V) that can operate efficiently to convert $NO_X$ constituents in the exhaust gas flow 16 in the presence of a reductant 23 such as ammonia ($NH_3$). The $NH_3$ may be produced by thermal decomposition of an $NH_3$ reductant such as urea, within exhaust aftertreatment system 10. The SCR catalyst compound is preferably resistant to HC adsorption and poisoning as has been shown with certain copper-based catalyst compounds. The $NH_3$ reductant 23, supplied from reductant supply tank 19 through conduit 17, is injected into the exhaust gas conduit 14 at a location upstream of the SCR catalyst device 22 using a reactant injector in the form of reductant injector 26 (e.g., for injection of urea or $NH_3$) that is in fluid communication with exhaust gas conduit 14, or other suitable method of delivery of the reductant to the exhaust gas flow 16. The $NH_3$ reductant 23 may be in the form of a gas, a liquid or an aqueous urea solution and may be mixed with air in the reductant injector 26 to aid in the dispersion of the injected spray.

In an exemplary embodiment, an exhaust gas filter assembly, in this case the PF device 28 is located within the exhaust aftertreatment system 10, downstream of the SCR catalyst device 22 and operates to filter the exhaust gas flow 16 of carbon and other exhaust borne particulates. The PF device 28 may be constructed using a ceramic wall flow monolith exhaust gas filter 30 that is packaged in a rigid, heat resistant shell or canister 31, having an inlet and an outlet in fluid communication with the exhaust gas conduit 14. Exhaust gas flow 16 entering the exhaust gas filter 30 is forced to migrate through porous, adjacently extending walls and, it is through this mechanism that the exhaust gas is filtered of carbon and other particulates. The filtered particulates are deposited within the exhaust gas filter 30. It is appreciated that the ceramic wall flow monolith exhaust gas filter 30 is merely exemplary in nature and that the PF device 28 may include other filter devices such as wound or packed fiber filters, open cell foams, sintered metal fibers, etc.

In an exemplary embodiment, the increase in exhaust gas backpressure caused by the accumulation of particulate matter requires that the PF device 28 be periodically cleaned, or regenerated. Regeneration involves the oxidation or burning of the accumulated carbon and other particulates in what is typically a high temperature (>600° C.) environment. For regeneration purposes, a second oxidation catalyst device (OC2) 32 is disposed upstream of the PF device 28, between the PF device and the SCR catalyst 22. The OC2 32 may be located in a separate canister 35, FIG. 6, or it may be located within the PF canister 31 (not shown). Like the OC1 18, the OC2 32 may include a flow-through metal or ceramic monolith substrate 34 that is wrapped in an intumescent mat (not shown) that expands when heated to secure and insulate the substrate 34 in canister 35. The substrate 34 has an oxidation catalyst compound (not shown) disposed thereon. The OC compound may be applied as a wash coat and may contain platinum group metals such as platinum (Pt), palladium (Pd), rhodium (Rh) or other suitable oxidizing catalysts, or combination thereof, as described herein.

As illustrated in FIG. 6, disposed upstream of OC1 18, in fluid communication with the exhaust gas flow 16 in the exhaust gas conduit 14, is the HC or fuel injector 38. The fuel injector 38, in fluid communication with HC supply 40 in fuel supply tank 42 through fluid conduit 44, is configured to introduce unburned HC 46 into the exhaust gas stream upstream of OC1 18. A controller such as a vehicle or an engine controller 48 is operably connected to, and monitors, the exhaust aftertreatment system 10 through signal communication with a number of sensors. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

In an exemplary embodiment, a backpressure sensor 50, located upstream of PF device 28, generates a signal indicative of the carbon and particulate loading in the ceramic wall flow monolith exhaust gas filter 30. Upon a determination that the backpressure has reached a predetermined level, indicative of the need to clean or regenerate the exhaust gas filter 30 of the PF device 28, the controller 48 activates the fuel injector 38 to supply HC 40 to the exhaust gas flow 16, as described. In the particular embodiment illustrated, the OC1 18 has a volume and a catalyst compound loading that is sufficiently active to oxidize only a portion of the HC 40 that is injected by the fuel injector 38. The OC1 18 is configured to oxidize only the portion of injected HC 46 that will result in an increase in the temperature of the exhaust gas flow 16 upstream of the SCR catalyst device 22 to a level at which the SCR catalyst device 22 will not absorb unburned HC 46 that has passed through OC1 18 in an un-oxidized state; thereby avoiding poisoning and deactivation of the SCR catalyst composition.

The remaining portion of injected HC 46 that passes through the SCR catalyst device 22 is thoroughly mixed with the exhaust gas flow 16 by the mixer 100. Following its exit from the SCR catalyst device 22 the HC/exhaust gas mixture enters the OC2 32 where the remaining portion of the unburned, injected HC 40 is oxidized prior to its entry into the PF device 28. In an exemplary embodiment, OC2 32 has a and a catalyst compound loading that is sufficiently active to oxidize the remaining portion of the HC 46 that is injected by the fuel injector 38 but that has passed or slipped through the OC1 18 and will result in an increase in the temperature of the exhaust gas flow 16 a temperature that is suitable for combustion of the carbon and particulate matter in the ceramic wall flow monolith exhaust gas filter 30. The controller 48 may monitor the temperature of the exhaust gas in the ceramic wall flow monolith exhaust gas filter 30 through temperature sensor 52, as well as the exhaust gas temperature upstream of the OC1 18 through temperature sensor 54 and adjust the HC delivery rate of fuel injector 38 to maintain the desired temperatures as indicated.

Bi-metallic couple 150 of mixer 100, as well as active material 160 if employed, may be thermally activated by changes in temperature of the mixer 100 associated with temperature variations within exhaust gas flow 16 as described herein. The exhaust aftertreatment system 10 and mixer 100 may also optionally be activated by an activation device, such as a thermal activation device 142, which may include a resistance heater, which is operatively associated with and in thermal communication with bi-metallic couple 150. The activation device 142 is configured for signal communication with the engine controller 48, whereby the bi-metallic couple 150 is activated for movement of the airfoil portion 104 by the operation of activation device 142 by engine controller 48.

Referring to FIGS. 1-7, a method 201 of using and operating an exhaust aftertreatment system 10 for an internal combustion engine 12 includes disposing 210 a mixer 100 into an exhaust gas conduit 14 of an exhaust aftertreatment system 12. The mixer 100 includes a body portion 102 that is configured to be disposed in the exhaust gas conduit 14 and an airfoil portion 104 comprising a bi-metallic couple 150 (as well as an active material 160 where employed), which is disposed on the body portion 102 and is reversibly movable between a deployed position 106 and a retracted position 108 by activation of the bi-metallic couple 150. In the deployed position 106 the airfoil portion 104 provides a deployed resistance to an exhaust gas flow 16 and in the retracted position 108 provides a retracted resistance, wherein the deployed resistance is greater than the refracted resistance. Method 201 also includes operating 220 an internal combustion engine 12 to produce the exhaust gas flow 16 in the exhaust gas conduit 14. Method 201 further includes activating 230 the bi-metallic couple 150 to move the airfoil portion 104 to the deployed position 106 followed by initiating 240 injection of a reactant material into the exhaust gas conduit 14 through an injector 26 located upstream of the mixer 100. Still further, method 201 includes terminating 250 injection of the reactant material and deactivating 260 the bi-metallic couple 150 to move the airfoil portion 104 to the retracted position 108. In an exemplary embodiment, activating 230 the bi-metallic couple 150 comprises passive activation based on the CTE mismatch of the first material 152 and second material 154 when the mixer 100 is heated to a predetermined temperature, and wherein deactivating 260 the active material comprises passive deactivation by reversal of the same mechanism based on the CTE mismatch when the mixer 100 is cooled below the predetermined temperature. In another exemplary embodiment of method 201, the exhaust aftertreatment system 10 further comprises an activation device 142 and an engine controller 48, the activation device 142 is operatively coupled to the bi-metallic couple 150 and configured for signal communication with the engine controller 48, and activating 230 and deactivating 260 the active bi-metallic couple 150 is accomplished by signal communication from the engine controller 48 to the activation device 142. In another exemplary embodiment, activating 230 the bi-metallic couple 150 comprises providing 232 a heating signal to the activation device 142 and heating 234 the bi-metallic couple 150 to provide the necessary CTE within the couple to change the position and shape and deactivating 260 the bi-metallic couple 150 comprises removing 262 the heating signal from the activation device 142 and cooling 264 the bi-metallic couple 150 to initiate a reversal of the CTE mismatch 150 when the mixer 100 is cooled below the predetermined temperature.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A mixer for an exhaust aftertreatment system, comprising:
    an exhaust conduit defining an exhaust gas flow path within the conduit;
    a body portion disposed in the exhaust gas flow path within the exhaust conduit upstream of an exhaust aftertreatment device;
    an airfoil portion that is disposed, on the body portion in the exhaust gas flow path within the exhaust conduit and reversibly movable, relative to the body portion, between a deployed position and a retracted position, wherein in the deployed position the airfoil portion allows flow of exhaust gas along the exhaust gas flow path past the body portion and the airfoil portion and provides a deployed resistance to exhaust gas flow along the exhaust gas flow path, and in the retracted position allows flow of exhaust gas along the exhaust gas flow path past the body portion and the airfoil portion and provides a retracted resistance to exhaust gas flow along the exhaust gas flow path, and the deployed resistance is greater than the retracted resistance; and
    a bimetallic couple that is operatively joined to the body portion and configured to reversibly move the airfoil portion, relative to the body portion, from the retracted position to the deployed position;
    wherein, in the retracted position, the airfoil portion extends axially from the body portion so as to form a retracted deployment angle;
    wherein, in the deployed position, the airfoil portion is angulated with respect to the body portion so as to form a deployed deployment angle; and
    wherein the deployed deployment angle is greater than the retracted deployment angle.

2. The mixer of claim 1, wherein the bimetallic couple comprises a first metal having a first coefficient of thermal expansion and a second metal having a second coefficient of thermal expansion, and wherein the first coefficient of thermal expansion and second coefficient of thermal expansion are different.

3. The mixer of claim 2, wherein the body portion comprises the first metal and the second metal is disposed on the body portion to form the bimetallic couple of the first metal and the second metal.

4. The mixer of claim 3, wherein the second metal is disposed on the body portion or the airfoil portion, or both of them, to form the bimetallic couple.

5. The mixer of claim 2, further comprising an activation device operatively associated with the bi-metallic couple, the activation device configured for signal communication with a controller, wherein the bi-metallic couple is activated for movement of the airfoil portion to the retracted position and to the deployed position by the activation device and the controller during exhaust flow.

6. The mixer of claim 1, wherein the body portion comprises a first metal, and the bimetallic couple comprises a second metal and a third metal that are different than the first metal.

7. The mixer of claim 1, wherein the airfoil portion has a deployed shape in the deployed position and a retracted shape in the retracted position, and the deployed shape and the retracted shape are the same shape.

8. The mixer of claim 7, wherein the deployed shape and the retracted shape are a flat planar shape.

9. The mixer of claim 1, wherein, in the retracted position, the airfoil portion is coplanar with, and extends axially from, the body portion such that the refracted deployment angle is approximately zero.

10. The mixer of claim 1, wherein in the retracted position, the airfoil portion is coplanar with and extends axially from the base portion.

11. The mixer of claim 1, wherein the body portion comprises a band having a plurality of radially-extending, circumferentially-spaced lobes about a mixer axis, and the airfoil portion comprises a plurality of movable air foil portions axially-extending from the band and configured for movement between the deployed position and the retracted position.

12. An exhaust aftertreatment system for an internal combustion engine, comprising:
an exhaust aftertreatment device that is configured for fluid communication with an internal combustion engine to receive an exhaust gas flow therefrom through an exhaust conduit, the exhaust conduit defining an exhaust gas flow path within the exhaust conduit; and
a mixer that is located in the exhaust gas flow path in the exhaust conduit upstream of the exhaust aftertreatment device, the mixer comprising a body portion disposed in the exhaust gas flow path in the exhaust conduit and an airfoil portion that is disposed on the body portion in the exhaust gas flow path within the exhaust conduit and reversibly movable, relative to the body portion, between a deployed position and a retracted position, wherein in the deployed position the airfoil portion allows flow of exhaust gas along the exhaust gas flow path past the body portion and the airfoil portion and provides a deployed resistance to the exhaust gas flow along the exhaust gas flow path and in the retracted position allows flow of exhaust gas along the exhaust gas flow path past the body portion and the airfoil portion and provides a retracted resistance along the gas flow path, and the deployed resistance is greater than the retracted resistance;
an active material that is operatively joined to the body portion and configured to reversibly move the airfoil portion, relative to the body portion, from the retracted position to the deployed position; and
an injector that is located upstream of the mixer, the injector configured to inject a reactant into the exhaust gas flow;
wherein, in the retracted position, the airfoil portion extends axially from the body portion so as to form a retracted deployment angle;
wherein, in the deployed position, the airfoil portion is angulated with respect to the body portion so as to form a deployed deployment angle; and
wherein the deployed deployment angle is greater than the retracted deployment angle.

13. The exhaust aftertreatment system of claim 12, wherein the active material is configured for activation and reversible movement of the airfoil portion between the deployed position and the refracted position.

14. The exhaust aftertreatment system of claim 13, wherein the active material comprises a two-way shape memory alloy.

15. The exhaust aftertreatment system of claim 13, further comprising an oxidation catalyst located upstream of the mixer, wherein the oxidation catalyst is configured to provide activation of the active material.

16. The exhaust aftertreatment system of claim 13, further comprising an activation device operatively coupled to the active material, the activation device configured for signal communication with a controller, wherein the activation device and controller provide activation of the active material to cause movement of the airfoil portion to the retracted position and to the deployed position by the activation device and the controller during exhaust flow.

17. A method of operating an exhaust aftertreatment system for an internal combustion engine, comprising:
disposing a mixer into an exhaust conduit of an exhaust aftertreatment system, the exhaust conduit defining an exhaust gas flow path within the exhaust conduit, the mixer comprising a body portion and an airfoil portion disposed in the exhaust gas flow path within the exhaust conduit, the body portion comprising an active material that is reversibly movable so as to cause the airfoil portion to move relative to the body portion between a deployed position and a retracted position by activation of the active material, wherein in the deployed position the airfoil portion allows flow of exhaust gas along the exhaust gas flow path past the body portion and the airfoil portion and provides a deployed resistance to exhaust gas flow along the exhaust gas flow path, and in the retracted position allows flow of exhaust gas along the exhaust gas flow path past the body portion and the airfoil portion and provides a retracted resistance to exhaust flow alone the exhaust gas flow path, and the deployed resistance is greater than the retracted resistance;
operating an internal combustion engine to produce the exhaust gas flow in the exhaust conduit;
activating the active material to move the airfoil portion to the deployed position;
initiating injection of a reactant material into the exhaust conduit through an injector located upstream of the mixer;
terminating injection of the reactant material; and
deactivating the active material to move the airfoil portion to the retracted position,
wherein, in the retracted position, the airfoil portion extends axially from the body portion so as to form a retracted deployment angle;
wherein, in the deployed position, the airfoil portion is angulated with respect to the body portion so as to form a deployed deployment angle; and wherein the deployed deployment angle is greater than the retracted deployment angle.

18. The method of claim 17, wherein activating the active material comprises passive activation by initiation of a phase change within the active material from a first phase to a second phase when the mixer is heated to a predetermined temperature, and wherein deactivating the active material comprises passive deactivation by initiation of a reverse phase change within the active material from the second phase to the first phase when the mixer is cooled below the predetermined temperature.

19. The method of claim 17, wherein the exhaust aftertreatment system further comprises an activation device and a controller, the activation device operatively coupled to the active material and configured for signal communication with the controller, and wherein activating and deactivating the active material is accomplished by signal communication from the controller to the activation device to cause movement of the airfoil portion to the retracted position and to the deployed position by the activation device and the controller during exhaust flow.

20. The method of claim 19, wherein activating the active material comprises:
providing a heating signal to the activation device; and
heating the active material to a predetermined temperature to initiate a phase change within the active material from a first phase to a second phase;
and wherein deactivating the active material comprises:
removing the heating signal from the activation device; and
cooling the active material to initiate a reverse phase change within the active material from the second phase to the first phase when the mixer is cooled below the predetermined temperature.

* * * * *